Dec. 6, 1938.　　　　E. G. SKODA　　　　2,139,289
CONDIMENT DISPENSER
Filed Dec. 24, 1936
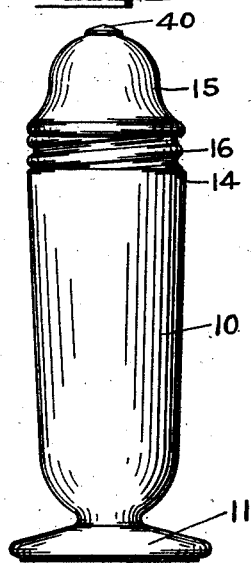
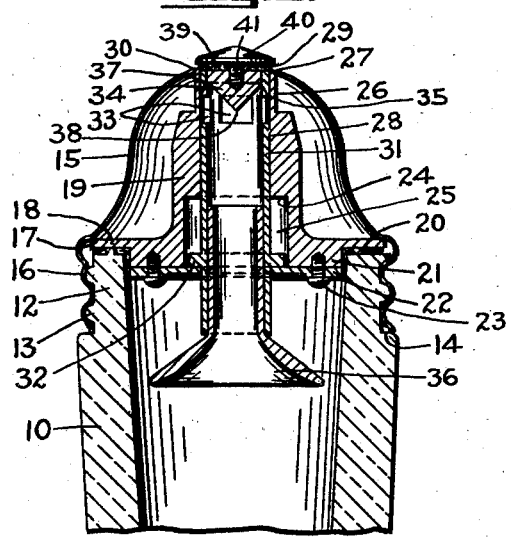
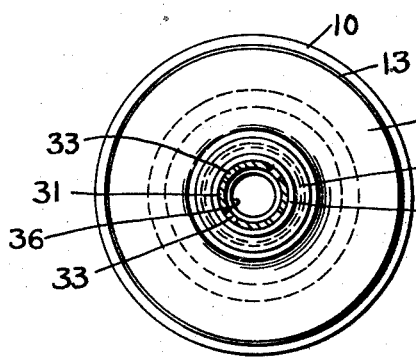
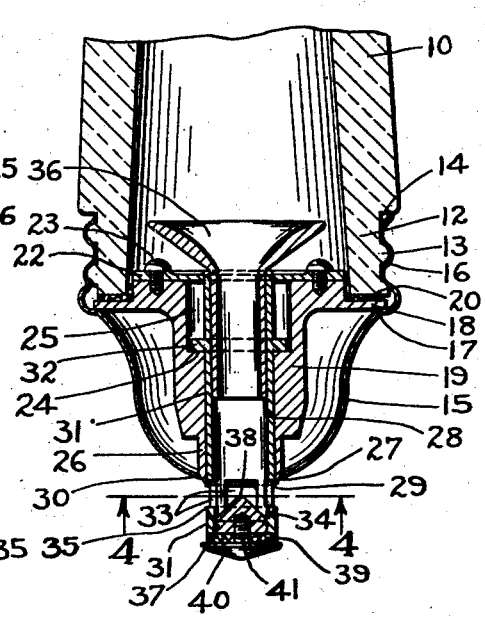
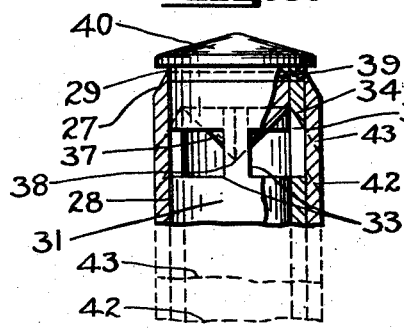
INVENTOR
EMIL G. SKODA
BY
ATTORNEY Patented Dec. 6, 1938

2,139,289

UNITED STATES PATENT OFFICE 2,139,289

CONDIMENT DISPENSER

Emil G. Skoda, Bridgeport, Conn.

Application December 24, 1936, Serial No. 117,594

4 Claims. (Cl. 65—45)

This invention relates to condiment dispensers and more particularly to a dispenser for condiments of a moisture absorbing nature, such as salt, and its features are especially adapted for embodiment in the structure of a salt cellar.

In the dispensing of salt and like comdiments, it is especially desirable that the same will freely flow from the receptacle under substantially all atmospheric conditions and particularly during damp or humid intervals, and that the receptacle be sealed to prevent the access of the atmosphere to the condiment therein when it is not in use, to reduce the absorption of moisture thereby to a minimum, and the consequent filling up of the outlet openings by hardened condiment.

One of the objects of this invention is to provide an improved form of condiment dispenser.

Another object is to provide in a condiment dispenser in the form of a salt cellar operable means whereby the interior of the device is sealed from the atmosphere when the same is not in use.

Further objects are to provide means in a condiment dispenser of the above nature to direct the condiment toward the outlet therefore and to disturb and remove any condiment adhering at the outlet which might interfere with the subsequent passage of condiment therethrough.

A still further object is to provide a condiment dispenser of generally improved construction, relatively inexpensive to manufacture, pleasing in appearance, readily accessible for cleaning and particularly efficient and durable in use.

With the above and other objects in view, which will appear as the description proceeds, the invention comprises the novel features and combinations of elements to be hereinafter described and claimed, reference being made to the accompanying drawing wherein;

Fig. 1 is an elevational view of a condiment dispenser in the form of a salt cellar which embodies the features of this invention;

Fig. 2 is an enlarged section taken on the line 2—2 in Figure 1 and shows the disposition of the operable parts when the device is not in use;

Fig. 3 is a view similar to Figure 2 but showing the disposition of the operable parts of the device when the same is in use;

Fig. 4 is a sectional view taken on the line 4—4 of Figure 3;

Fig. 5 is a still further enlarged view partly in section of the nozzle or outlet end of the device of this invention and illustrating by the use of dotted lines various relative positions of the operable parts.

Referring now to the drawing, wherein like reference characters designate like parts throughout the several views, a receptacle 10 is illustrated which has a base portion 11, by which the receptacle may be supported upon a horizontal surface in a vertical position, and an open neck portion 12, the diameter of which is slightly less than the adjacent body portion and is provided with external threads 13 formed about its periphery, the reduced diameter forming an upwardly directed annular shoulder 14. A dome cover member 15 having a threaded cylindrical base portion 16 adapted to be screwed upon the receptacle neck portion 12. The cover member 15 is formed to provide a shoulder 17 to overlie the open end of the receptacle neck 12, and to engage and clamp the edge of an annular flange 18 formed on, and extending about, one end of an outwardly extending sleeve 19. A leather or like washer 20 is provided and disposed between the flange 18 and the end of the receptacle neck 12 and constitutes a seal between these parts when the same are clamped together by the cover member 15.

The parts constituting the outlet nozzle for the device of this invention include the sleeve 19 which is extended rearwardly beyond the flange 18 to provide a short cylindrical portion 21 about which the washer 20 is disposed and to which it fits, and to form a flat end surface to which a disc shaped plate 22 is secured by screws 23. The rear end of the sleeve 19 is counterbored to provide an inwardly directed shoulder 24 and an opening 25 over the open end of which the plate 22 extends to partially close the same. The sleeve 19 is reduced in diameter at its outer end to form a short cylindrical portion 26, the end edge of which is beveled inwardly as at 27 toward the bore 28 of the sleeve 19 to provide a knife edge 29 thereabout. Herein the domed portion of the cover member 15 is extended outwardly and curved to dispose the edge of an opening 30 formed therein into contact with the beveled surface 27.

A tubular member 31 is disposed in the bore 28 of the sleeve 19 and is freely slidable therethrough. The member 31 extends inwardly and passes through an opening in the plate 22. An annular flange 32 is provided on the member 31 and is positioned thereon to be disposed in the counterbore 25 in the sleeve 19 and engage either the plate 22 or the shoulder 24 to limit the sliding movement of the member 31 with respect to the sleeve 19 in either an inward or outward direction respectively. The outer end of the tubular member 31 is provided with a plurality of openings 33 which are spaced apart about its periphery and disposed adjacent the end thereof. The inwardly directed edge of each of the openings 33 is beveled outwardly as at 34 toward the periphery of the member 31 to form a knife edge 35 at this point. A funnel shaped part 36 having a tubular extension telescoped within and secured to the tubular member 31 is disposed upon the inner end of the member 31 to direct the condiment in the receptacle into the member 31. The member 36 acts as a weight upon the lower end of the tubular member 31 to normally retain said member in its closed position.

A pointed plug 37, circular at its upper portion and pyramidal at its lower pointed portion, is disposed in and secured to the outer end of the member 31 with its pointed end 38 directed inwardly and disposed substantially midway between the inner and outer edges of the openings 33, with its flat sides facing said openings, whereby condiment passing outwardly through the member 31 will be deflected by said flat sides transversely through the openings 33. A disc of leather or like material 39 is clamped to the outer end of the member 31 by a cap 40 which is provided with a stem 41 threadingly engaging the cone plug 37 in a suitable threaded opening therein. The diameter of the disc 39 is substantially the same as the diameter of the member 31 and is a snug fit in the bore 28 of the sleeve 19. The diameter of the cap 40 is slightly more than that of the member 31 so as to overlie the same.

The above parts constituting the nozzle for the device are arranged in assembled relation and retained together by the plate 22 when it is secured upon the surface of the cylindrical portion 21. The arrangement is such that when the condiment dispenser is not in use and is supported in a vertical position as shown in Figures 1 and 2 gravity acting upon the assembled movable parts constituted by the funnel 36, the tubular member 31, the cone plug 37, and the cap 40 will cause them to drop into the position shown in Figure 2. When the parts are in this position the flange 32 engages the plate 22 to limit further downward movement and to prevent the undersurface of the cap 40 from contacting with the knife edge 29 on the end of the member 31. While moving into the closed position as shown in Figure 2, the disc 39 enters the bore 28 of the sleeve 19 and, due to snugly fitting the same, effectively seals the interior of the receptacle 10 from the atmosphere without the same.

When it is desired to obtain condiment from the receptacle 10 the dispenser is turned upside down as shown in Figure 3, whereupon the above mentioned movable parts assume the position shown thereby. Condiment will thereupon flow through the funnel 36 into the member 31 and upon striking the cone plug 37 will be deflected transversely outwardly through the openings 33. After a sufficient amount of condiment has been obtained the dispenser is returned to its vertically supported position during which movement the knife edges 35 of the openings 33 pass by the knife edge 29 on the end of the member 31 and, in doing so, disturb and remove any condiment adhering to the adjacent surfaces and edges whereby the openings 33 are maintained fully open and free from obstructions. The movement of the knife edges 35 past the knife edge 29 is illustrated in Figure 5 wherein the full lines indicate the closed position, the lower dotted lines 42, the fully open position, and the intermediate dotted lines 43 indicate the movement of these knife edges past each other.

While a preferred and practical embodiment of this invention has been illustrated and described it will be understood that the same is not to be limited to the specific details and structure shown, as the same may be altered and changed without departing from the spirit and scope of this invention as defined in the appended claims.

Having thus fully described the invention, what is claimed as new and for which Letters Patent is desired is:

1. An outlet nozzle for a dispensing receptacle for condiments or the like comprising an outwardly directed sleeve having a bore, a tubular member disposed in the bore of said sleeve and slidable therein having a passage extending to its inner end and having a transversely directed opening adjacent its outer end communicating with said passage, outwardly flared weight means at the inner end of said tubular member having a central opening communicating with said passage adapted to direct condiment from the receptacle to said passage when the receptacle is inverted, and a sealing member on the outer end of said tubular member adapted to seal the bore of said sleeve.

2. An outlet nozzle for a dispensing receptacle for condiments or the like comprising an outwardly directed sleeve having a bore, a tubular member disposed in the bore of said sleeve and slidable therein and having a transversely directed opening in its periphery adjacent its end, the end of said sleeve and an edge about the opening in said member having cooperating knife edges adapted to pass each other when the member is slidingly moved in the bore of said sleeve, a cap secured to and extending over the end of said member, means to prevent the knife edge on the end of said sleeve from engaging said cap, and a washer of yieldable material secured to the end of said member between said cap and said member having its outer periphery exposed and adapted to enter and snugly fit into the bore of said sleeve.

3. In a dispenser for condiments or the like, an outlet nozzle of tubular form open at its inner end and closed at its outer end having a plurality of circumferentially arranged spaced outlet openings contiguous to said closed end, and condiment deflecting means disposed in said nozzle consisting of a member having a tapered surface disposed inwardly and in transversely opposed relation to said openings and converging toward said open end of said tubular form adapted to deflect the condiment outwardly through said openings.

4. In a condiment dispenser, an outlet nozzle of tubular form open at its inner end and closed at its outer end having a plurality of circumferentially arranged spaced outlet openings contiguous to said closed end, and condiment deflecting means disposed in said nozzle consisting of a member having a plurality of flat inclined surfaces respectively disposed inwardly and in transversely opposed relation to said openings and converging toward said open end of said tubular form adapted to deflect the condiment outwardly through said openings.

EMIL G. SKODA.